US012607567B1

(12) United States Patent
Chen et al.

(10) Patent No.: US 12,607,567 B1
(45) Date of Patent: Apr. 21, 2026

(54) APPARATUS AND METHOD FOR MONITORING IMPURITY RATE AND BREAKAGE RATE OF GRAINS IN GRAIN-BIN OF HARVESTER

(71) Applicant: SHANDONG ACADEMY OF AGRICULTURAL MACHINERY SCIENCES, Jinan (CN)

(72) Inventors: Gang Chen, Jinan (CN); Jingxin Shen, Jinan (CN); Yitian Sun, Jinan (CN); Rui Li, Jinan (CN); Qinglong Li, Jinan (CN); Yongjia Sun, Jinan (CN); Zhiming Wei, Jinan (CN); Zhiqi Zhang, Jinan (CN)

(73) Assignee: SHANDONG ACADEMY OF AGRICULTURAL MACHINERY SCIENCES, Jinan (CN)

( * ) Notice: Subject to any disclaimer, the term of this patent is extended or adjusted under 35 U.S.C. 154(b) by 0 days.

(21) Appl. No.: 19/123,445

(22) PCT Filed: Sep. 26, 2024

(86) PCT No.: PCT/CN2024/121255
§ 371 (c)(1),
(2) Date: Apr. 23, 2025

(87) PCT Pub. No.: WO2025/189728
PCT Pub. Date: Sep. 18, 2025

(30) Foreign Application Priority Data

Mar. 13, 2024 (CN) .......................... 202410287170.6

(51) Int. Cl.
*G01N 21/88* (2006.01)
*B07B 4/08* (2006.01)
(Continued)

(52) U.S. Cl.
CPC ........... *G01N 21/8803* (2013.01); *B07B 4/08* (2013.01); *G01G 17/04* (2013.01); *G01N 21/892* (2013.01); *G01N 2021/8592* (2013.01)

(58) Field of Classification Search
CPC ............. G01N 21/8803; G01N 21/892; G01N 2021/8592; B07B 4/08; G01G 17/04
See application file for complete search history.

(56) References Cited

U.S. PATENT DOCUMENTS

2022/0067912 A1 3/2022 Zhang et al.

FOREIGN PATENT DOCUMENTS

CN 206330969 U 7/2017
CN 108107049 A 6/2018
(Continued)

*Primary Examiner* — Jacob S. Scott
*Assistant Examiner* — Miraj T. Patel
(74) *Attorney, Agent, or Firm* — IPro, PLLC; Na Xu

(57) ABSTRACT

The present invention relates to the technical field of agricultural machinery, and discloses an apparatus and a method for monitoring impurity rate and breakage rate of grains in a grain-bin of a harvester, wherein the apparatus cannot only detect the impurity and breakage rates, but also collect impurities in grains, improving the cleanliness of grains in the grain bin through the arrangements of an impurity box, a grain-weighing box and a sieving mechanism; the apparatus stores respectively the grains and the impurities into the grain-weighing box and the impurity box through the sieving mechanism, realizes the separation detection of grain impurity and breakage rates, improves the detection accuracy; and, when detecting the breakage rate, the grains are distributed in mono-layer and sparsely by setting Geneva conveying mechanism and spread scraper, avoiding the obstruction between grains and further improving the visual detection accuracy of breakage rate.

8 Claims, 2 Drawing Sheets

(51) Int. Cl.
    *G01G 17/04*      (2006.01)
    *G01N 21/85*      (2006.01)
    *G01N 21/892*    (2006.01)

(56)              References Cited

FOREIGN PATENT DOCUMENTS

| | | | |
|---|---|---|---|
| CN | 109870381 | A | 6/2019 |
| CN | 209829585 | U | 12/2019 |
| CN | 210230659 | U | 4/2020 |
| CN | 111937571 | A | 11/2020 |
| CN | 113298085 | A | 8/2021 |
| CN | 214516026 | U | 10/2021 |
| CN | 113678648 | A | 11/2021 |
| CN | 113820325 | A | 12/2021 |
| CN | 216679060 | U | 6/2022 |
| CN | 216795803 | U | 6/2022 |
| CN | 116593542 | A | 8/2023 |
| CN | 219483411 | U | 8/2023 |
| CN | 116806558 | A | 9/2023 |
| CN | 118225764 | A | 6/2024 |
| WO | 2021174909 | A1 | 9/2021 |

APPARATUS AND METHOD FOR MONITORING IMPURITY RATE AND BREAKAGE RATE OF GRAINS IN GRAIN-BIN OF HARVESTER

CROSS-REFERENCE TO RELATED APPLICATIONS

This invention claims priority benefits to Chinese patent application number 202410287170.6, entitled "Apparatus and Method for Monitoring Impurity Rate and Breakage Rate of Grains in Grain-bin of Harvester", filed on Mar. 13, 2024 with the China National Intellectual Property Administration, the entire contents of which are incorporated herein by reference and constitute a part of the present invention for all purposes.

TECHNICAL FIELD

The present invention relates to the technical field of agricultural machinery, in particular to an apparatus and a method for monitoring impurity rate and breakage rate of grains in a grain-bin of a harvester.

BACKGROUND

The impurity rate and breakage rate of grains in the grain bin of a combine harvester are important indexes to measure its working quality, and also important basis to adjust the working parameters of working parts of the combine harvester. With the continuous development of machine vision technology, machine vision technology began to be used to monitor the impurity rate and breakage rate of grains. However, visual monitoring cannot go deep into the grain accumulation body, and only reflects the image characteristics of a surface of the accumulated grains; meanwhile, there are mutual occlusion and overlapping between the grains and the impurities, and the color similarity between the impurities and the grains is high. These factors increase the difficulty of visual recognition, which leads to certain errors in the current machine vision monitoring of grain impurity and breakage rates.

The Chinese patent CN111937571A discloses an on-line detection apparatus for grain impurity and breakage rates of a combine harvester and a grain bin, which can realize the adjustment of "one-side" current limit according to different grains, and continuously shoot samples in the process of "one-side" transportation, so as to prevent missing shooting of impurities and broken grains. However, in this solution, the grain impurity and breakage rates are detected simultaneously, so that the grain after detection cannot be separated from the impurity, and the cleanliness of the grain finally entering the grain bin is not high enough. Another Chinese patent CN109870381A discloses a grain impurity-rate monitoring apparatus in a grain-bin, which can realize the separation of grains and impurities; however, it can only detect the grain impurity rate, and cannot realize the simultaneous detection of the grain impurity and breakage rates.

SUMMARY

Aiming at the defects of the prior art, one object of the present invention is to provide an apparatus and a method for monitoring impurity rate and breakage rate of grains in a grain-bin of a harvester, wherein the grains and impurities can be collected separately at first through an arrangement of a sieving mechanism, and then the impurity rate and the breakage rate of the grains can be detected by weighing calculation and image acquisition; and the apparatus can collect impurities in the grains while detecting the impurity rate and the breakage rate, so that the cleanliness of the grains in the grain bin is improved.

In order to achieve the above object, the present invention is realized through the following technical solutions.

In a first aspect, providing an apparatus for monitoring impurity rate and breakage rate of grains in a grain-bin of a harvester, comprising:

a grain-weighing box, and an impurity box is provided on a first side of the grain-weighing box, a weighing sensor and a fixing plate being capable of rotating are both provided in the grain-weighing box and the impurity box, a bearing plate is arranged between the fixing plate and the weighing sensor, the impurity rate may be calculated by detecting masses of the grains and impurities, a collecting box is arranged at a lower part of the grain-weighing box, and a Geneva conveying mechanism is arranged at a bottom of the collecting box;

a conveying belt, being arranged below the Geneva conveying mechanism, and an industrial camera is arranged at a tail end of the conveying belt; a spread scraper is arranged above a portion of the conveying belt between the industrial camera and the Geneva conveying mechanism, so that the industrial camera can carry out mono-layer breakage detection on the grains; and a sieving mechanism, comprising an arc-shaped impurity-removing sieve arranged above the grain-weighing box, and a combing mechanism is arranged above an end of the impurity-removing sieve for spreading a grain mixture on the impurity-removing sieve and discharging the impurities on the impurity-removing sieve into the impurity box.

As a further implementation mode, the grain-weighing box, the impurity box, the sieving mechanism and the conveying belt are mounted inside a housing, the grain-weighing box and the impurity box are arranged in parallel, an opening is provided on a top of the housing, and a temporary storage box is arranged at the opening.

As a further implementation mode, the temporary storage box is positioned right above the sieving mechanism, and the temporary storage box comprises a turnover plate positioned at a bottom thereof, an electromagnetic fixing pin is provided on one side of the turnover plate, a full-position switch is provided on an inner wall of the temporary storage box, and when the grains reach a full position, the turnover plate is driven to rotate by a drive motor on the temporary storage box, and the grains are discharged downward to the sieving mechanism.

As a further implementation mode, a fan is arranged on a side surface of the housing and corresponding to the impurity-removing sieve, a tail end of the impurity-removing sieve is arranged close to the impurity box, and a retractable baffle plate is arranged at the tail end of the impurity-removing sieve.

As a further implementation mode, the combing mechanism is arranged above the baffle plate and comprises a comb-driving motor fixed at the inner side of the housing, wherein the comb-driving motor is connected with a push-pull rod in a crank rocker mode, and the push-pull rod is connected to rubber comb teeth, so that the rubber comb teeth reciprocate on a surface of the impurity-removing sieve.

As a further implementation, the weighing sensor in each of the grain-weighing box and the impurity box is fixedly connected between the fixing plate and the bearing plate respectively, the bearing plate is used to carry the grains or the impurities, the fixing plate drives the bearing plate to rotate through a turnover-driving motor, and a fixing mechanism is provided on one side of the fixing plate.

As a further implementation mode, photoelectric sensors are arranged on inner walls of the grain-weighing box and the impurity box, and are used for changing a state of the sieving mechanism according to a falling state of the grains.

As a further implementation mode, the Geneva conveying mechanism is arranged at the bottom of the collecting box, and a grain-falling duct is arranged below the Geneva conveying mechanism.

As a further implementation mode, the conveying belt is arranged transversely and a front end thereof is arranged below the Geneva conveying mechanism, and a distance between the spread scraper and the conveying belt is adapted to a height of one grain.

In a second aspect, providing a method for monitoring impurity rate and breakage rate of grains in a grain-bin of a harvester, using the monitoring apparatus as described in any one of the above, comprises the following steps:

triggering a full-position switch after the grains reach the full position in a temporary storage box, rotating a turnover plate to enable the grains to fall onto a impurity-removing sieve; spreading the grains by actions of rubber comb teeth, separating the grains from impurities and falling into a grain-weighing box, discharging the impurities into an impurity box by a combing mechanism, and calculating an impurity rate by detecting masses of the grains and the impurities; and after grain weighing is finished, opening a bottom of the grain-weighing box through a rotation of the fixing plate, to allow the grains enter the collecting box and are intermittently output to a conveying belt through a Geneva conveying mechanism, spreading the grains distributed at intervals into a mono-layer distribution state after passing through a spread scraper, carrying out an image acquisition on the passing grains by an industrial camera, obtaining morphological characteristics of broken grains after processing the acquired grain images, and calculating a breakage rate of the grain.

The beneficial effects of the present invention are as follows:

1) According to the present invention, by setting up a sieving mechanism, the grains can firstly be separated and collected from impurities, and then the impurity and breakage rates of grains are detected through weighing calculation and image acquisition. This apparatus cannot only detect the impurity and breakage rates, but also collect impurities in grains, improving the cleanliness of grains in the grain bin; in addition, the detection of impurity rate and breakage rate is separated, which improves the detection accuracy; by setting up the Geneva conveying mechanism and the spread scraper, mono-layer and sparse distribution of grains during the detection of crushing rate can be achieved, avoiding the occlusion among grains and further improving the visual detection accuracy of breakage rate.

2) According to the present invention, based on the arrangement of the combing mechanism and the baffle plate, when the grains are separated from impurities, the baffle plate is retracted to prevent the grains from falling into the impurity box, and the combing mechanism drives the rubber comb teeth to reciprocate on the impurity-removing sieve in the form of crank rocker, so as to realize that the grains quickly pass through sieve holes.

3) According to the present invention, based on the arrangement of a variable frequency fan, a small part of impurities can be blew to the impurity box when the grains fall to the impurity-removing sieve; when the photoelectric sensor in the grain-weighing box cannot detect the grains falling signal, increasing power of the variable frequency fans, putting down the baffle plate, and the combing mechanism moves in reverse direction to push the impurities remaining on the impurity-removing sieve to the impurity box, thereby improving the cleanliness of the grains and realizing separate detection of the impurity rate and the breakage rate.

4) According to the present invention, a full-position switch and a turnover plate is provided in the temporary storage box, to realize that a controlling of rotating of the turnover plate to discharge the grain mixture to the sieving mechanism when the temporary storage box is full of the grain mixture.

5) According to the present invention, weighing sensors and corresponding bearing plates and fixing plates are arranged in the grain-weighing box and the impurity box, so that the grains can be discharged into the collecting box or the impurities can be discharged manually; and, the corresponding fixing mechanism can prevent the fixing plates from accidentally turning over.

6) According to the present invention, the distance between the spread scraper and the conveying belt is a mono-layer height of grains, which ensures that the grains present a mono-layer arrangement on the conveying belt, reduces difficulty of acquiring images with subsequent industrial cameras, and improves the monitoring accuracy of the breakage rate.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

In the figures: the spacing or dimensions between each part are exaggerated to display their positions, and the schematic diagram is only for illustration purposes.

Wherein: 1, temporary storage box; 2, full-position switch; 3, turnover-driving motor (on temporary storage box); 4, fan; 5, impurity-removing sieve; 6, photoelectric sensor; 7, turnover-driving motor (on grain-weighing box); 8, Geneva conveying mechanism; 9, convey-driving motor; 10, driving pulley; 11, spread scraper; 12, driven pulley; 13, industrial camera; 14, turnover-driving motor (on impurity box); 15, housing; 16, comb-driving motor; 17, push-pull rod; 18, rubber comb teeth; 19, electromagnetic fixed pin; 20, turnover plate; 21, grain-weighing box; 22, bearing plate; 23, grain-weighing sensor; 24, fixing plate; 25, fixing mechanism; 26, collecting box; 27, grain-falling duct; 28, conveying belt; 29, fixing plate; 30, fixing mechanism; 31, impurity-weighing sensor; 32, bearing plate; 33, impurity box; 34, photoelectric sensor; 35, receiving and releasing-driving (R&R-driving) motor; 36, baffle plate.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

Example 1

Figure 1:
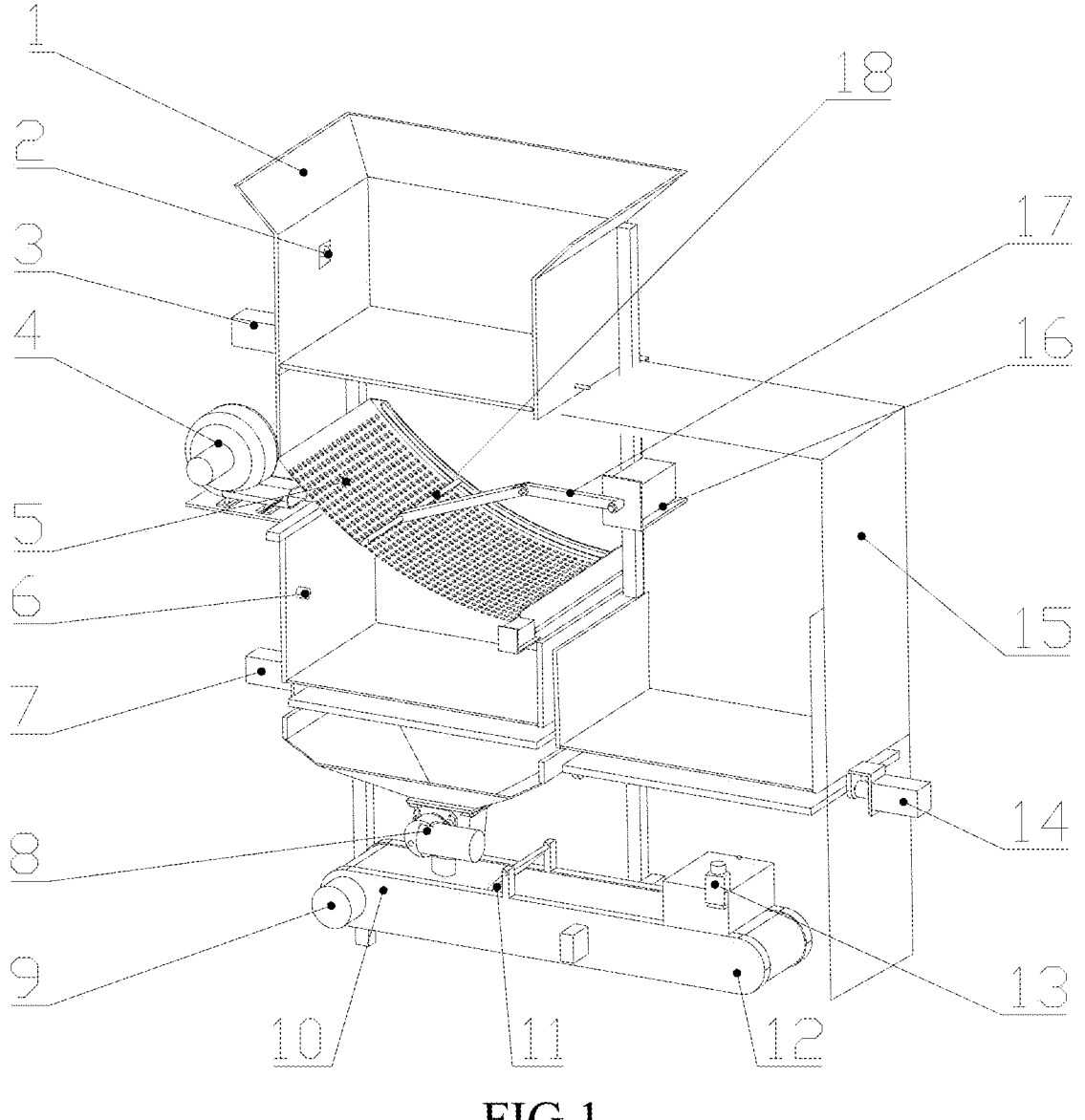
FIG. 1 is an axial sectional view of an apparatus for monitoring impurity rate and breakage rate of grains according to an example of the present invention.

In a typical example of the present invention, referring to FIG. 1, providing an apparatus for monitoring impurity rate and breakage rate of grains in a grain-bin of a harvester, comprising a grain-weighing box 21, and an impurity box 33 is provided on one side of the grain-weighing box; weighing sensors and fixing plates being capable of rotating are provided in both the grain-weighing box 21 and the impurity box 33; a bearing plate is arranged between the fixing plate and the weighing sensor, and an impurity rate is calculated through masses of the grains and the impurities from detection; a collecting box 26 is arranged at a bottom of the grain-weighing box 21, and a Geneva conveying mechanism 8 is arranged at a bottom of the collecting box 26; a conveying belt 28 is arranged below the Geneva conveying mechanism 8 and an industrial camera 13 is arranged at a tail end of the conveying belt; a spread scraper 11 is arranged above a portion of the conveying belt 28 between the industrial camera 13 and the Geneva conveying mechanism 8, to realize the industrial camera 13 to carry out the detection on mono-layer breakage of grains; and, a sieving mechanism comprises an arc-shaped impurity-removing sieve 5 arranged above the grain-weighing box, and a combing mechanism is arranged above a tail end of the impurity-removing sieve 5 and used for discharging impurities on the impurity-removing sieve 5 into the impurity box 33.

The present apparatus can collect impurities in grains while detecting impurity rate and breakage rate, thereby improving the cleanliness of the grains in the grain bin. The present apparatus can realize separate detection of the impurity rate and the breakage rate of the grains, and improve detection accuracy. When detecting the breakage rate, the grains are distributed in a mono-layer distribution and sparsely, so that the occlusion among the grains is avoided, and the visual detection accuracy of the breakage rate is further improved.

Figure 2:
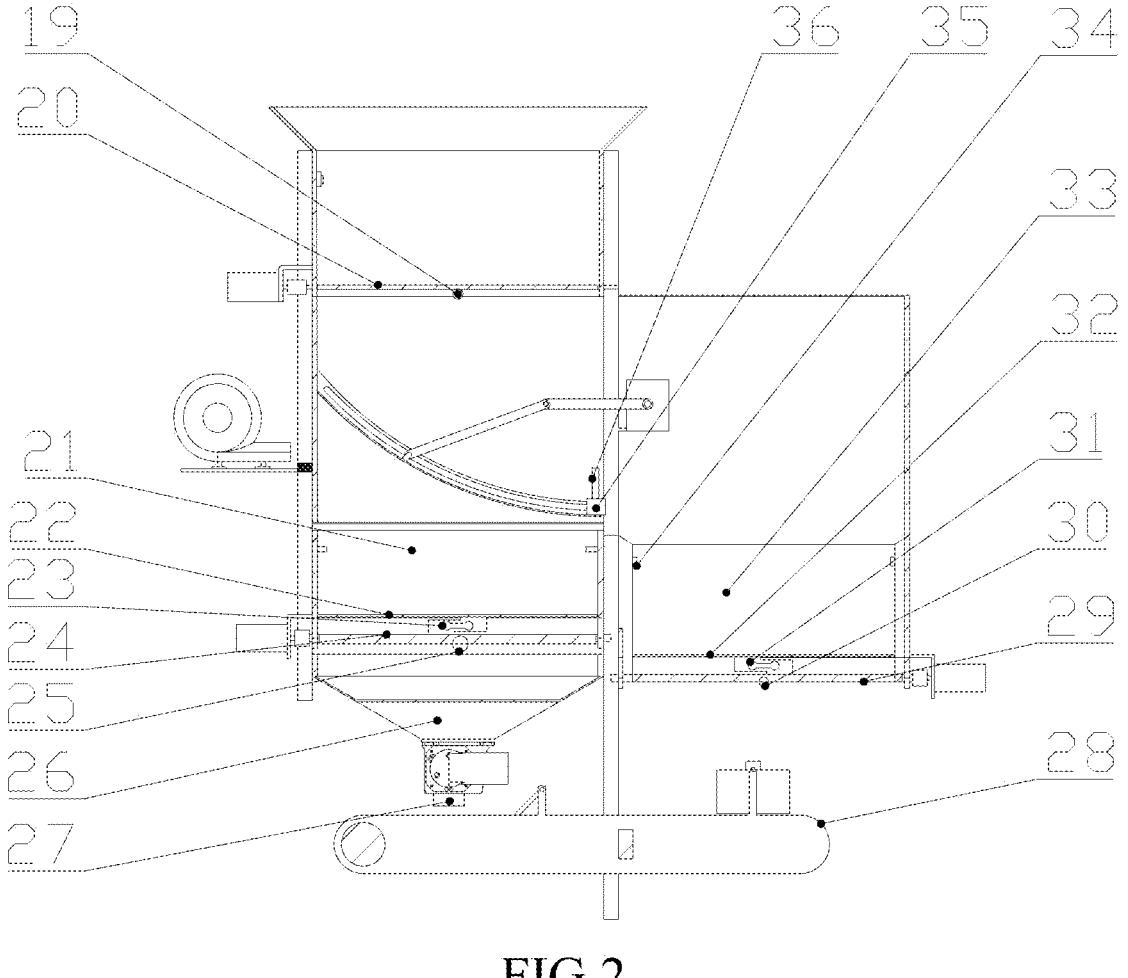
FIG. 2 is a front sectional view of the apparatus for monitoring impurity rate and breakage rate of grains according to an example of the present invention.

As shown in FIGS. 1 and 2, the apparatus with detection function comprises a housing 15, wherein the housing 15 is arranged inside the grain bin, an outer side of the housing 15 is fixed on a side wall of the grain bin, and the housing 15 can share a part of the side wall with the grain bin; the grains are introduced into the monitoring apparatus from a feed inlet of the grain bin through a duct, and the impurity rate and the breakage rate of the grains in the grain bin are intermittently detected.

As shown in FIG. 1, the grain-weighing box 21, the impurity box 33, the sieving mechanism and the conveying belt 28 are all mounted inside the housing 15, and the grain-weighing box 21 and the impurity box 33 are arranged in parallel; an opening is provided on a top of the housing

15, and a temporary storage box 1 is arranged at the opening, wherein the temporary storage box 1, the sieving mechanism, the grain-weighing box 21, the collecting box 26 and the conveying belt 28 are vertically distributed from top to bottom. An opening is provided on a top of the temporary storage box 1, and the grains are introduced into the temporary storage box 1 through the duct.

The temporary storage box 1 structurally comprises a full-position switch 2, a turnover-driving motor 3 of the temporary storage box and an opening and closing (O&C) mechanism of the temporary storage box, wherein the O&C mechanism of the temporary storage box comprises an electromagnetic fixing pin 19 and a turnover plate 20, wherein the turnover plate 20 serves as a bottom plate of the temporary storage box 1, the turnover-driving motor 3 of the temporary storage box is arranged on an outer wall of the temporary storage box 1, an output end of the turnover-driving motor 3 of the temporary storage box is connected with the turnover plate 20, the turnover-driving motor 3 of the temporary storage box drives the turnover plate 20 to rotate to open or close the temporary storage box 1. The electromagnetic fixing pin 19 is arranged at one side of the turnover plate 20 and forms an angle of 90° with a motor rotating shaft of the turnover-driving motor 3 of the temporary storage box. When the temporary storage box 1 is closed, a pin shaft of the electromagnetic fixing pin 19 extends out and supports the turnover plate 20, preventing the turnover plate 20 from turning over axially under the action of gravity. The full-position switch 2 is mounted on the top side wall of the temporary storage box 1, and is triggered to generate a high-level full-position signal when the grains reach the full position, and at this time, the turnover-driving motor 3 of the temporary storage box drives the turnover plate 20 to act, and the grains are discharged downward to the sieving mechanism.

The sieving mechanism comprises a fan 4, an impurity-removing sieve 5, a combing mechanism, an R&R-driving motor 35 and a baffle plate 36.

As shown in FIGS. 1 and 2, the impurity-removing sieve 5 is of an arc-shaped mesh sieve structure and is positioned right above the grain-weighing box 21, and sieves of different sizes can be selected according to different grains; the fan 4 is mounted outside the housing 15 below the impurity-removing sieve, and an air outlet of the fan 4 passes through the outer wall and faces the bottom surface of the impurity-removing sieve 5 transversely, and the fan 4 can be a frequency conversion fan.

The R&R-driving motor 35 is arranged at the tail of the impurity-removing sieve 5, an output end of the R&R-driving motor 35 is connected to the baffle plate 36, and can drive the baffle plate 36 to rotate, and the impurity box 33 is arranged below one side of the tail of the impurity-removing sieve 5.

The combing mechanism comprises a comb-driving motor 16, a push-pull rod 17 and rubber comb teeth 18, wherein the combing mechanism is positioned at the tail end of the impurity-removing sieve 5 and above the baffle plate 36; the comb-driving motor 16 is mounted inside the housing 15; the push-pull rod 17 is mounted on a rotating shaft of the comb-driving motor; the rubber comb teeth 18 are mounted on the push-pull rod 17; and the rubber comb teeth 18 are used for contacting the top surface of the impurity-removing sieve.

It can be understood that the motor 16 and the push-pull rod 17 are connected by a crank rocker, so that the rubber comb teeth 18 reciprocate on the top surface of the impurity-removing sieve 5, so as to divide and spread the grain mixture on the impurity-removing sieve 5, so that the grains may fall from sieve holes to the grain-weighing box 21 faster.

A vertical placement of the baffle plate 36 can be achieved by adjusting the baffle plate 36 by the R&R-driving motor 35, and when the impurity-removing sieve 5 is sieving grains, the baffle plate 36 is erected to prevent the grains from falling into the impurity box 33; after the grains are sieved, the baffle plate 36 is lowered, and the rubber comb teeth 18 push the impurities remaining on the impurity-removing sieve 5 into the impurity box 33, so as to realize the separation of grains and the impurities.

In the present example, a grain collecting mechanism is arranged right below the sieving mechanism, and the grain collecting mechanism structurally comprises a photoelectric sensor 6, a grain-weighing box 21, a grain-weighing sensor 23 and a turnover mechanism of the grain-weighing box. The turnover mechanism of the grain-weighing box comprises a turnover-driving motor 7 of the grain-weighing box, a bearing plate 22, a fixing plate 24 and a fixing mechanism 25.

The photoelectric sensor 6 is mounted on the box wall of the grain-weighing box 21 to detect the falling state of the grains and change the state of the sieving mechanism according to the falling state of the grains; rotating shafts at both ends of the fixing plate 24 are mounted on bearings on two opposite outer side walls of the grain-weighing box 21 and connected to the turnover-driving motor 7 of the grain-weighing box at the side of the housing. There are two fixing mechanisms 25 mounted on the outer wall of the bottom of the grain-weighing box 21 and arranged at an angle of 90° to the rotating shaft on the fixing plate 24. The fixing mechanism 25 may be a push-pull electromagnet, and the push rod of the electromagnet can be inserted into a shaft hole on the fixing plate 24 to fix the fixing plate 24 and prevent the fixing plate 24 from accidentally rotating. The grain-weighing sensor 23 is connected between the bearing plate 22 and the fixing plate 24 by bolts, and the bearing plate 22 is positioned above the fixing plate 24, and the grains falling onto the bearing plate 22 can obtain the mass of the grains through the support of the fixing plate 24 and the detection of the grain-weighing sensor 23. The turnover-driving motor 7 of the grain-weighing box can drive the fixing plate 24 to rotate, so as to realize the rotation of the bearing plate 22, and unload the weighed grains into the collecting box 26.

One side of the grain collecting mechanism is provided with an impurity collecting mechanism in parallel. The impurity collecting mechanism comprises an impurity box 33, an impurity-weighing sensor 31, a photoelectric sensor 34 and a turnover mechanism of the impurity box. The turnover mechanism of the impurity box is the same as the turnover mechanism of the grain-weighing box, and comprises a turnover-driving motor 14 of the impurity box, a bearing plate 32, a fixing plate 29 and a fixing mechanism 30; the impurity-weighing sensor 31 is connected to the bearing plate 32 and the fixing plate 29 through bolts; the photoelectric sensor 34 is mounted on the top side wall of the impurity box 33; when the impurity box 33 is full, a full-position signal is triggered, and an acousto-optic alarm prompts a worker that the impurity box 33 is full and impurities in the impurity box 33 need to be cleaned.

It can be understood that the principle of the turnover mechanism of the impurity box in the impurity box 33 is the same as that of the turnover mechanism of the grain-weighing box, and is not described here. The bearing plate

32 in the impurity box 33 is used for bearing the impurities, and the impurity-weighing sensor 31 is used for detecting the mass of the impurities.

The collecting box 26 is connected to the bottom of the grain-weighing box 21, and the collecting box 26 is positioned below the fixing plate 24. After the fixing plate 24 and the bearing plate 22 are turned over, the grains fall into the collecting box 26. A Geneva conveying mechanism 8 is arranged at the bottom of the collecting box 26, and a grain-falling duct 27 is arranged below the Geneva conveying mechanism 8. The grain conveying mechanism comprises the conveying belt 28 mounted on the housing 15, the conveying belt 28 is laterally disposed and the front end thereof is disposed below the Geneva conveying mechanism 8, and the distance between the spread scraper 11 and the conveying belt 28 are adapted to the height of one grain.

The grains in the collecting box 26 can drop onto the conveying belt 28 via the Geneva conveying mechanism 8 and the grain-falling duct 27. The industrial camera 13 is arranged at the end of the conveying belt 28, and the spread scraper 11 is arranged above a portion of the conveying belt 28 between the industrial camera 13 and the Geneva conveying mechanism 8, so that the industrial camera 13 can detect mono-layer breakage of grains.

In the present example, the industrial camera 13 is used to capture images of the grains on the grain conveying mechanism; the grains in the collecting box 26 are scattered onto the conveying belt 28 through the Geneva conveying mechanism 8 and the grain-falling duct 27, and the sparse state of the grains scattered onto the conveying belt 28 can be changed by adjusting a rotation speed of the Geneva conveying mechanism 8.

Specifically, the grain conveying mechanism comprises a convey-driving motor 9, the conveying belt 28, a driving pulley 10, a driven pulley 12, and the spread scraper 11. The convey-driving motor 9 is connected to the driving pulley 10 through a coupling, the driving pulley 10 and the driven pulley 12 are connected through the conveying belt 28, and the spread scraper 11 is obliquely mounted on the conveying belt 28 and is one grain-height away from the conveying belt 28, so that the grains on the conveying belt 28 are distributed in a mono-layer. The grains falling onto the grain conveying mechanism finally fall laterally to the grain bin from the side the driven pulley 12 located.

According to the apparatus for monitoring impurity rate and breakage rate of grains in the grain-bin of the harvester of the present example, firstly separating the grains from the impurities in the grain mixture, and then monitoring the impurity rate, which realizes removal and collection of the impurities in grains in the grain bin during impurity rate monitoring, reduces interference of the impurities on breakage rate monitoring, and improves cleanliness of the grains in the grain bin; in the breakage rate monitoring process, thinning and mono-layer processing can be realized on the grains, mutual occlusion among the grains is avoided, the accuracy of image processing is improved, and the accuracy of the final impurity rate and breakage rate is better.

Example 2

In a typical example of the present invention, referring to FIGS. 1-2, providing a method for monitoring impurity rate and breakage rate of grains in a grain-bin of a harvester, using the detection apparatus of Example 1 and comprising the following steps:

(1) Monitoring Method of a Grain Impurity Rate

Grains first fall into a temporary storage box 1 through a duct for temporary storage, and when the temporary storage box 1 is full, a full-position switch 2 is triggered, at this time, a baffle plate 36 is controlled by an R&R-driving motor 35 to be in an upright state, an electromagnetic fixing pin 19 is controlled to contract by a controller, a turnover plate 20 is driven to rotate by a turnover-driving motor 3 of the temporary storage box, the temporary storage box 1 is opened, the grains in the temporary storage box fall onto a impurity-removing sieve 5, after a period of time, the bottom of the temporary storage box 1 is closed under the rotation of the turnover-driving motor 3 of the temporary storage box, and the electromagnetic fixing pin 19 is controlled to extend out to fix the turnover plate 20, and the temporary storage box 1 continues to carry the grains.

After the grains fall onto the impurity-removing sieve 5, a comb-driving motor 16 operates in the forward direction, and rubber comb teeth 18 are driven to act by a push-pull rod 17; meanwhile, a variable frequency fan 4 blows air from below the impurity-removing sieve 5, and light impurities in the grains are blown up and then fall into the impurity box 33 at the tail of the impurity-removing sieve 5, so as to realize the independent collection of the impurities and improve the cleanliness of the grains. After spreading by the rubber comb teeth 18, the grains quickly fall into a grain-weighing box 21 through sieve holes, causing the signal change of the photoelectric sensor 6 on the grain-weighing box 21. When no grains fall on the impurity-removing sieve 5, photoelectric sensor 6 has no signal for a long time, at this time, the variable frequency fan 4 operates at high wind speed, the baffle plate 36 is driven to be put down by the R&R-driving motor 35 controlled by the controller, the comb-driving motor 16 operates in reverse, residual impurities on the impurity-removing sieve 5 are cleaned into the impurity box 33 under the joint action of the rubber comb teeth 18 and the variable frequency fan 4, and after a period of time, the baffle plate 36 is raised upright by controlling the R&R-driving motor 35.

After the grains fall into the grain-weighing box 21, the grain-weighing sensor 23 at the bottom measures the mass m of the falling grains, and the impurity-weighing sensor 31 in the impurity box 33 measures the mass m' of the falling impurities;

wherein, $$m' = m'_{total} - m'_{previous},$$

where $$m'_{total}$$

is a total mass of the impurities in the impurity box 33, and $$m'_{previous}$$

is a total mass of the impurities in the impurity box 33 measured previously. At this time, one measurement of the grain mass and the impurity mass is completed. Take an average of N measured values, obtaining a grain mass $$\bar{m}, \bar{m} = \frac{\sum_{i=1}^{N} m_i}{N},$$

and an impurity mass $$\bar{m'}, \bar{m'} = \frac{\sum_{i=1}^{N} m'_i}{N},$$

where N is the number of measurements, and then obtaining the impurity rate of the grain as:

$$A_{impurity1} = \frac{\bar{m'}}{\bar{m} + \bar{m'}} \times 100\%.$$

After grain weighing is finished, controlling the push rod of the fixing mechanism 25 at the bottom of the grain-weighing box 21 is controlled to be withdrawn from the shaft hole on the fixing plate 24, the fixing plate 24 is driven to rotate by the turnover-driving motor 7 of the grain-weighing box, the bottom of the grain-weighing box 21 is opened, the grains slide into the collecting box 26; after a period of time, the turnover-driving motor 7 of the grain-weighing box is controlled to close the bottom of the grain-weighing box 21, the push rod of the fixing mechanism 25 is inserted into the shaft hole on the fixing plate 24, and the impurity rate monitoring operation is completed at this time. Then, the bottom of the temporary storage box 1 is opened, the grains fall onto the impurity-removing sieve 5, and the impurity rate is monitored next time.

(2) Monitoring Method of Grain Breakage Rate

After the grains fall into the collecting box 26, a Geneva conveying mechanism 8 is controlled to operate, and the grains are conveyed to the grain-falling duct 27 below the Geneva conveying mechanism 8 by rotating of a sheave, and the grains fall onto the conveying belt 28 in a free falling state. The sheave may be of an eight-groove structure and intermittently outputs the grains to the conveying belt 28. If the rotating speed of the sheave is set to $n_1$, an interval of the grain falling time is set to $$\Delta t, \Delta t = \frac{1}{8n_1}.$$

After the grains fall onto the conveying belt 28, a spacing between the grains is $$D, D = \frac{2\pi n_2 r}{8n_1},$$

where $n_2$ is the rotation speed of a driving pulley on the conveying belt 28 and r is the radius of the driving pulley of the conveying belt. By adjusting the rotation speed $n_1$ of the sheave and the rotation speed $n_2$ of the driving pulley of the conveying belt, the gap between the grains can be adjusted, so that the grains on the conveying belt 28 are thinly distributed.

The grains are conveyed laterally by the conveying belt 28 under the action of the convey-driving motor 9, and the grains falling on the conveying belt 28 are distributed into a mono-layer distribution state after passing through the spread scraper 11. Through the combined action of the sheave and the spread scraper 11, the grains falling onto the conveying belt 28 are finally distributed in a sparse and mono-layer state, so that the occlusion between the grains is avoided, which is convenient for the image acquisition of the subsequent industrial camera 13.

After the grains on the conveying belt 28 travel to an imaging area of the industrial camera 13, the industrial camera 13 captures images of the grains on the conveying belt 28. In order to avoid overlapping or missing images, a trigger period T of the camera must be equal to a time t required for the grains to move along the boundary length l of the camera field of view, that is $$T = t, t = \frac{l}{2\pi n_2 r},$$

where l is the boundary length of the camera field of view, $n_2$ is the rotation speed of the driving pulley of the conveying belt, and r is the radius of the driving pulley of the conveying belt. The camera trigger cycle can be set according to the rotation speed of the driving pulley of the conveying belt. The morphological characteristics of broken grains are obtained by processing the acquired grain images by using methods of image conversion, threshold segmentation, feature extraction, contour edge extraction and like in the controller, and then a proportion of broken grains are calculated. The image recognition technology used by the present invention is a common and effective image processing technology, and will not be described in detail. After measuring for M times, the breakage rate $\overline{A_{breakage}}$ of the grains in the grain bin is obtained, $$\overline{A_{breakage}} = \frac{\sum_{i=1}^{M} A_{breakage-i}}{M},$$

where M is the number of measurements.

(3) Impurity Rate Correction

The grains falling into the collecting box 26 still contain some impurities, which can be identified in the image recognition process, and to obtain the impurity rate $A_{impurity2}$, and then the impurity rate of the grains in the grain bin is:

$$A_{impurity} = \frac{\overline{m'} + \overline{m} \times A_{impurity2}}{\overline{m} + \overline{m'}} = A_{impurity1} + (1 - A_{impurity1})A_{impurity2}.$$

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. An apparatus for monitoring impurity rate and breakage rate of grains in a grain-bin of a harvester, comprising:

a grain-weighing box, and an impurity box is provided on a first side of the grain-weighing box, a weighing sensor and a fixing plate being capable of rotating are both provided in the grain-weighing box and the impurity box, a bearing plate is arranged between the fixing plate and the weighing sensor, the impurity rate may be calculated by detecting masses of the grains and impurities, a collecting box is arranged at a lower part of the grain-weighing box, and a Geneva conveying mechanism is arranged at a bottom of the collecting box;

a conveying belt, being arranged below the Geneva conveying mechanism, and an industrial camera is arranged at a tail end of the conveying belt; a spread scraper is arranged above a portion of the conveying belt between the industrial camera and the Geneva conveying mechanism, so that the industrial camera may carry out mono-layer breakage detection on the grains; and a sieving mechanism, comprising an arc-shaped impurity-removing sieve arranged above the grain-weighing box, and a combing mechanism is arranged above an end of the impurity-removing sieve for spreading a grain mixture on the impurity-removing sieve and discharging the impurities on the impurity-removing sieve into the impurity box; wherein, the grain-weighing box, the impurity box, the sieving mechanism and the conveying belt are mounted inside a housing, an opening is provided on a top of the housing, and a temporary storage box is arranged at the opening;

the temporary storage box is positioned right above the sieving mechanism, and the temporary storage box comprises a turnover plate positioned at a bottom thereof, an electromagnetic fixing pin is provided on one side of the turnover plate, a full-position switch is provided on an inner wall of the temporary storage box, and when the grains reach a full position, the turnover plate is driven to rotate by a drive motor on the temporary storage box, and the grains are discharged downward to the sieving mechanism; a fan is arranged on a side surface of the housing and corresponding to the impurity-removing sieve, a tail end of the impurity-removing sieve is arranged close to the impurity box, and a retractable baffle plate is arranged at the tail end of the impurity-removing sieve; and the conveyor belt is arranged transversely and a front end of the conveyor belt is arranged below the Geneva conveyor mechanism, and the grains are intermittently output to the conveyor belt through the Geneva conveyor mechanism; after passing through the spread scraper, the grains distributed at intervals are spread into a mono-layer distribution state; and, in an image acquisition process, a camera triggering cycle is configured to be equal to a time required for the grains to move along a boundary length of a camera field of view, to avoid overlapping or missing images in acquired images.

2. The apparatus for monitoring the impurity rate and the breakage rate of the grains in the grain-bin of the harvester according to claim 1, wherein the grain-weighing box and the impurity box are arranged in parallel.

3. The apparatus for monitoring the impurity rate and the breakage rate of the grains in the grain-bin of the harvester according to claim 1, wherein the combing mechanism is arranged above the baffle plate and comprises a comb-driving motor fixed at the inner side of the housing, wherein the comb-driving motor is connected with a push-pull rod in a crank rocker mode, and the push-pull rod is connected to rubber comb teeth, so that the rubber comb teeth reciprocate on a surface of the impurity-removing sieve.

4. The apparatus for monitoring the impurity rate and the breakage rate of the grains in the grain-bin of the harvester according to claim 1, wherein the weighing sensor in each of the grain-weighing box and the impurity box is fixedly connected between the fixing plate and the bearing plate respectively, the bearing plate is used to carry the grains or the impurities, the fixing plate drives the bearing plate to rotate through a turnover-driving motor, and a fixing mechanism is provided on one side of the fixing plate.

5. The apparatus for monitoring the impurity rate and the breakage rate of the grains in the grain-bin of the harvester according to claim 4, wherein photoelectric sensors are arranged on inner walls of the grain-weighing box and the impurity box, and are used for changing a state of the sieving mechanism according to a falling state of the grains.

6. The apparatus for monitoring the impurity rate and the breakage rate of the grains in the grain-bin of the harvester according to claim 2, wherein the Geneva conveying mechanism is arranged at the bottom of the collecting box, and a grain-falling duct is arranged below the Geneva conveying mechanism.

7. The apparatus for monitoring the impurity rate and the breakage rate of the grains in the grain-bin of the harvester according to claim 1, wherein a distance between the spread scraper and the conveying belt is configured to be a height of one grain.

8. A method for monitoring impurity rate and breakage rate of grains in a grain-bin of a harvester, using a monitoring apparatus according to claim 1, comprising the following steps:

triggering a full-position switch after the grains reach the full position in a temporary storage box, rotating a turnover plate to enable the grains to fall onto a impurity-removing sieve; spreading the grains by actions of rubber comb teeth, separating the grains from impurities and falling into a grain-weighing box, discharging the impurities into an impurity box by a combing mechanism, and calculating an impurity rate by detecting masses of the grains and the impurities; and after grain weighing is finished, opening a bottom of the grain-weighing box through a rotation of the fixing plate, to allow the grains enter the collecting box and are intermittently output to a conveying belt through a Geneva conveying mechanism, spreading the grains distributed at intervals into a mono-layer distribution state after passing through a spread scraper, carrying out an image acquisition on the passing grains by an industrial camera, obtaining morphological characteristics of broken grains after processing the acquired grain images, and calculating a breakage rate of the grain.

* * * * *